Oct. 30, 1945.  A. E. CARLSON  2,387,881
FILM EXPOSING APPARATUS
Filed Oct. 31, 1942   2 Sheets-Sheet 1
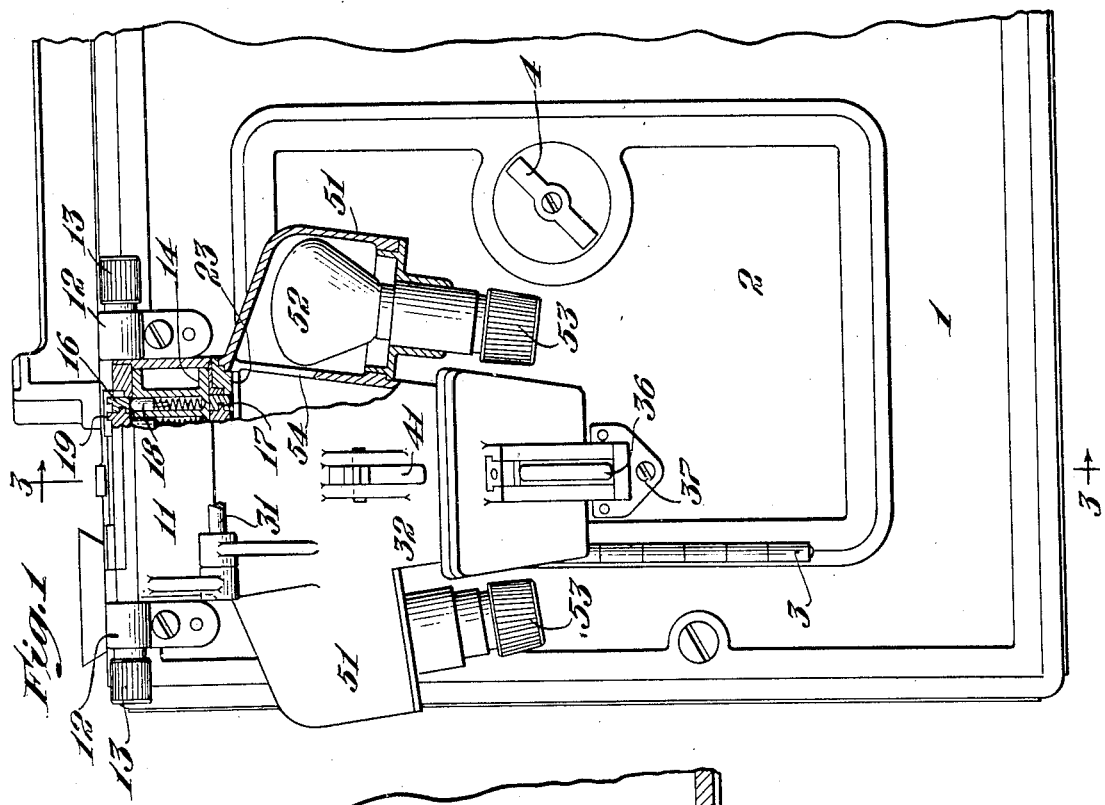
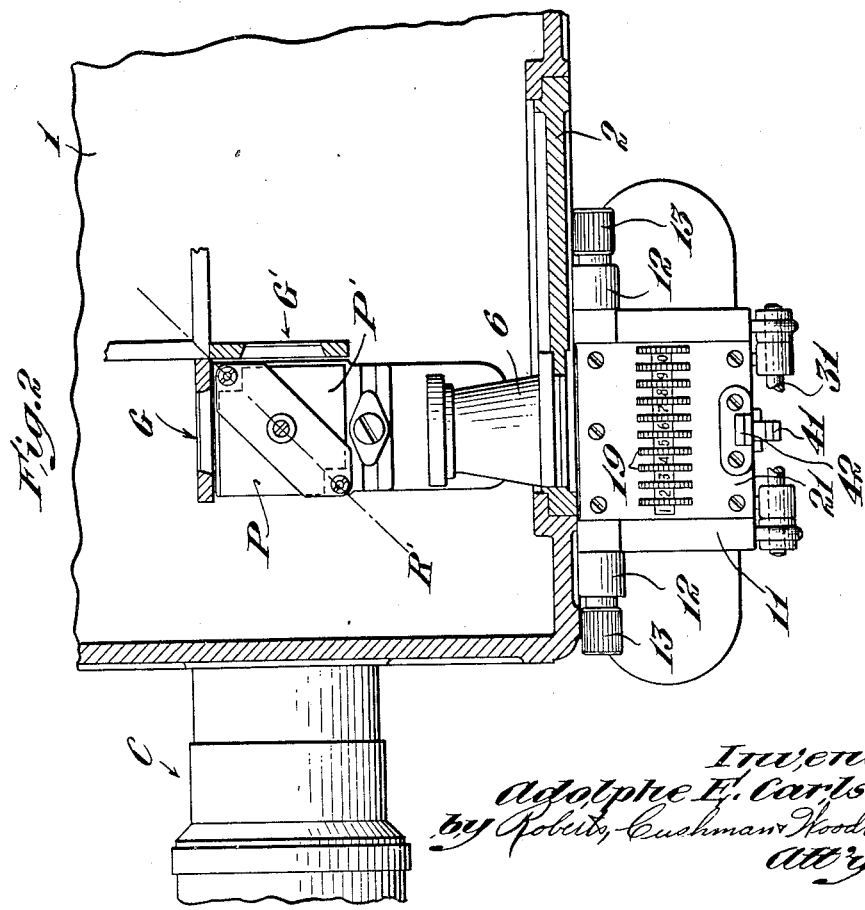
Inventor
Adolphe E. Carlson
by Roberts, Cushman & Woodbury
Attys.

Oct. 30, 1945.  A. E. CARLSON  2,387,881
FILM EXPOSING APPARATUS
Filed Oct. 31, 1942  2 Sheets-Sheet 2
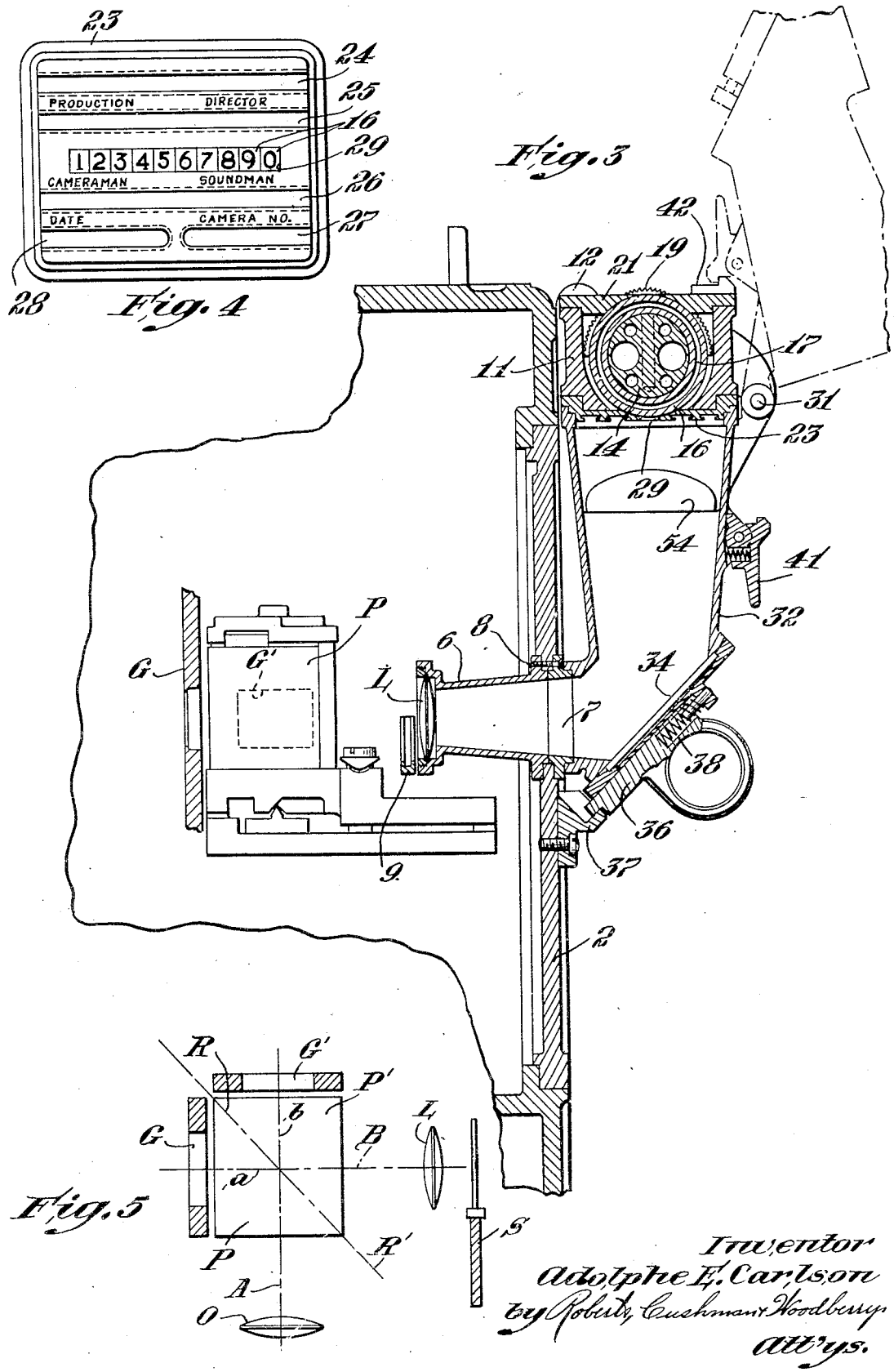

Patented Oct. 30, 1945

2,387,881

UNITED STATES PATENT OFFICE 2,387,881

FILM EXPOSING APPARATUS

Adolphe E. Carlson, Glendale, Calif., assignor to Technicolor Motion Picture Corporation, Hollywood, Calif., a corporation of Maine Application October 31, 1942, Serial No. 464,017

2 Claims. (Cl. 88—16)

In exposing motion picture film, both in making original exposures in cameras and in printing one film from another, it is often desirable to expose the film not only to a primary scene, but also to secondary objects such as a chart or slate or a background scene. For example in making original exposures of various sequences, it is desirable to record on the film at the beginning of each sequence various information such as the names of the production, the director, the camera man and the sound man, the date, the number of the camera and the number of the sequence. Heretofore it has been customary to record this information on a chart and hold the chart in front of the camera at the beginning of a sequence. This is always an awkward and troublesome procedure and sometimes it interferes with the arrangement of the set.

Objects of the present invention are to eliminate the trouble and delay incident to the aforesaid procedure and to provide a way of making the secondary exposure which is quick and facile and which does not interfere with the arrangement of the set.

According to the present invention the apparatus is provided with two film gates together with means for simultaneously focusing in the two gates primary images of the same scene which are geometrically similar, the means including a primary lens system and a partially transmitting reflector for transmitting and reflecting portions of the light from the lens system to the film gates respectively, in combination with a record holder, means for illuminating a record in the holder and means for focusing an image of the record in at least one of the film gates, the latter means including a secondary lens system intermediate the reflector and holder and the axes of the two lens systems intersecting the reflector from opposite sides, so that either lens system may be utilized without interference from the other and so that both systems may be used at the same time if desired. In camera work the desired data is inserted in the holder at the beginning of each sequence and then, before taking the sequence, the record holder is illuminated so that the data is recorded on the first part of the film. Both in making original exposures and in printing one film from another, the record holder may be in the form of a film gate for either still or moving pictures, the film in the record holder being illuminated either by reflected or transmitted light. By illuminating the picture or pictures in the record holder while exposing the film to an original scene, the pictures in the record holder are added to those of the scene, either in superposition or side by side as desired. For example the pictures on the auxiliary record may be in the form of floating clouds so that, when superposed on a scene taken along the primary optical system, they afford a cloud effect superposed on the scene. When the auxiliary record is in the form of a motion picture instead of stationary indicia a shutter may be interposed in the optical path of the auxiliary record, or the auxiliary record may be illuminated only during each recurrent exposure as for example by a Strobotac discharge lamp synchronized with the intermittent pauses of the auxiliary film.

For the purpose of illustration a typical embodiment of the invention is shown in the accompanying drawings in which Fig. 1 is a side view of a camera embodying the present invention, with parts broken away;

Fig. 2 is a top plan view with parts broken away;

Fig. 3 is a section on line 3—3 of Fig. 1;

Fig. 4 is a bottom plan view of the record holder; and

Fig. 5 is a diagram of the optical system.

The particular embodiment of the invention chosen for the purpose of illustration comprises a camera of the type shown in Patent 2,072,091. As shown in Fig. 5 this camera has a primary optical system including an objective lens O and a light-dividing prism unit including two prisms P and P' cemented together along their diagonal faces with a thin deposit of metal on one of the meeting surfaces of the prisms to form a partially transmitting reflector R. Thus light entering the system through the lens O passes along the primary optical axis A until it reaches the reflector R where part of the light is reflected along the branch path $a$ to a film or films in a film gate, a part of which is shown at G, and part of the light is transmitted through the reflector R along the branch path $b$ to a film or films in another film gate G'. As indicated in Fig. 5 a shutter S may be provided back of the lens L to obstruct light from the auxiliary record while the films are advancing in the gates G and G'.

According to the present invention the aforesaid secondary optical system comprises a lens L having an optical axis B which intersects the reflector R from the side opposite to that from which the optical axis A intersects the reflector. Thus a part of the light from lens L is reflected at R to a film at gate G', and a part of the light is transmitted to the film at gate G. With this arrangement the films may be exposed through either optical system or, if it is desired to form a composite picture, through both systems simultaneously.

As disclosed in the aforesaid patent the camera comprises a casing 1 having a door 2 affording access to the interior of the casing, the door being hinged at 3 and having a latch 4 for holding it closed. Mounted inside the casing, in the manner shown in the aforesaid patent, is the prism unit P—P' with the partially transmitting reflector R disposed in the plane R' (Figs. 2 and 5). The lens O is mounted in a barrel C as shown in Fig. 2 and in the aforesaid patent.

In the illustrative embodiment the lens L is mounted in a barrel 6 which is mounted in an opening in the door 2 by means of a ring 7 and screws 8. A holder 9 for a filter may be provided behind the lens L. Mounted above the door 2 on the outside of the housing 1 is a casing 11 which is secured to the housing by means of brackets 12 and screws 13. Extending lengthwise through the middle of the casing 11 is a cylindrical arbor 14 which is fixedly mounted in the ends of the casing with considerable clearance between its outer periphery and the inner surface of the casing 11. Rotatably mounted on this arbor are a series of rings 16, each ring bearing on its outer periphery a series of numerals from zero to nine. As shown in Figs. 1 and 3 each ring has a groove 17 in one side and the next ring has an end flange or rib fitting in the groove. Disposed in radial sockets in the arbor 14 are spring-pressed detents 18 for holding each ring in adjusted position. The numerals on the rings extend throughout only the lower half of their circumferences, and throughout the upper half the rings are provided with knurled flanges 19 which project upwardly through slots in the cover 21 of the housing 11. On the upper half of the periphery of each ring, adjacent to flange 19, the ring may be provided with a series of small numerals to indicate which of the larger numerals is in operative position at the bottom of the ring (Fig. 2).

Fast to the bottom of the casing 11 is a holder in the form of a plate 23 having dovetail grooves 24 to 28 to receive strips of indicia which may be slipped into the recesses from the ends of the plate. In the middle of the plate is a window 29 to expose the large numerals on the bottoms of the rings 16. By engagement with the knurled flanges 19 the rings may be rotated to expose through the window 29 any desired number to indicate a particular sequence. The aforesaid slips may carry any desired indicia such as the names of the production, the director, the camera man, the sound man, the date the picture is taken, the camera number, etc.

Pivotally mounted on a spindle 31 at the lower outside corner of the casing 11 is an L-shaped housing 32 which, in the closed position shown in Fig. 3, seats at the upper end against the plate 23 and at its lower end against the ring 7. Intermediate its ends the casing 32 is provided with an interior reflector 34 which is held at an angle of 45 degrees to the axis of lens L so that light from the plate 23 is reflected to the lens, the focal length of the lens L being such as to focus the light from the plate 23 in the film gates G and G'. The casing 32 is held in closed position by means of a latch 36 which is spring-pressed into engagement with a catch 37 on the housing by means of a spring 38. The housing 32 may be latched in the open position shown in broken lines in Fig. 3 by means of a latch 41 engageable with a detent 42 on the top plate 21 of the casing 11. When the casing 32 is swung to the open position the door 2 may be opened to afford access to the interior of the camera housing and slips may be inserted into the slots in the plate 23.

As shown in Fig. 1 the housing 32 is provided with lateral extensions 51 in which are mounted lamp bulbs 52, each lamp being provided with an outside switch 53 and suitable circuit connections not shown. The walls of the casing 32 are provided with windows 54 through which light may shine from the lamps 52 to the plate 23. When the lights are turned on the indicia on plate 23 are focused in the film gates G and G' to record the number exposed through the window 29 and the indicia carried by the slips. When the lamps are turned off no light reaches plate 23; consequently no shutter is necessary in the secondary optical system comprising the lens L.

From the foregoing it will be evident that the indicia carried by the plate 23 may be recorded on the film at the beginning of a sequence, either before the primary lens O is uncovered or after starting the sequence, merely by turning on the light 52, thereby avoiding the trouble and confusion of holding a placard in front of the camera.

It should be understood that the present disclosure is for the purpose of illustration only and that this invention includes all modifications and equivalents which fall within the scope of the appended claims.

I claim:

1. Cinematographic apparatus for exposing film comprising two film gates, means for simultaneously focusing in the two gates primary images of the same scene which are geometrically similar, said means including a primary lens system and a partially transmitting reflector for transmitting and reflecting portions of the light from said lens system to the film gates respectively, a record holder, means for focusing in one of said film gates an image of a record in said holder, said last focusing means including a secondary lens system intermediate said reflector and holder, the axes of said lens systems intersecting the reflector from opposite sides, a light-tight housing surrounding said holder and gates and lamps on opposite sides of the axis of the secondary lens system for illuminating a record in said holder, said housing including a hinged door to permit access to the film gates and said secondary lens system being mounted on the door and aligned with an opening therein, said record holder being disposed at one side of the door with a section of said housing interposed in the path of the door between the record holder and secondary lens system, said section enclosing the light path between the lens system and the record holder and being mounted for movement out of said path.

2. Cinematographic apparatus for exposing film comprising two film gates, means for simultaneously focusing in the two gates primary images of the same scene which are geometrically similar, said means including a primary lens system and a partially transmitting reflector for transmitting and reflecting portions of the light from said lens system to the film gates respectively, a record holder having means for detachably holding a record slip, means for illuminating a record in the holder, means for focusing an image of said record in one of the film gates, the latter means including a secondary lens system intermediate said reflector and holder, the axes of said lens systems intersecting the reflector from opposite sides, a light-tight housing surrounding said holder, and gates, said housing including a hinged door to permit access to the film gates and said secondary lens system being mounted on the door and aligned with an opening therein, said record holder being disposed at one side of the door with a section of said housing interposed in the path of the door between the record holder and secondary lens system, said section enclosing the light path between the lens system and the record holder and being mounted for movement out of said path.

ADOLPHE E. CARLSON.